United States Patent [19]

Ninomiya et al.

[11] Patent Number: 4,712,243
[45] Date of Patent: Dec. 8, 1987

[54] SPEECH RECOGNITION APPARATUS

[75] Inventors: Masao Ninomiya, Akishima; Susumu Takashima, Kodaira; Kazumasa Fukushima, Ichikawa; Masami Yuyama; Kazuyuki Kurosawa, both of Hamuramachi, all of Japan

[73] Assignee: Casio Computer Co., Ltd., Tokyo, Japan

[21] Appl. No.: 608,279

[22] Filed: May 8, 1984

[30] Foreign Application Priority Data

| May 9, 1983 | [JP] | Japan | 58-80437 |
| May 9, 1983 | [JP] | Japan | 58-80438 |
| May 9, 1983 | [JP] | Japan | 58-80435 |
| May 9, 1983 | [JP] | Japan | 58-80436 |

[51] Int. Cl.⁴ .............................................. G10L 5/00
[52] U.S. Cl. ...................................................... 381/43
[58] Field of Search ...................................... 381/43–45

[56] References Cited

U.S. PATENT DOCUMENTS 4,241,329 12/1980 Bahler et al. .......................... 381/45
4,488,243 12/1984 Brown et al. .......................... 381/43
4,559,604 12/1985 Ichikawa et al. ...................... 381/43
4,593,403 6/1986 Kishi et al. ............................ 381/43

Primary Examiner—Emanuel S. Kemeny
Attorney, Agent, or Firm—Frishauf, Holtz, Goodman & Woodward

[57] ABSTRACT

The present invention provides a speech recognition apparatus for recognizing speech by converting voice signal into digital data. The apparatus performs a two-stage Dynamic Programming (DP) operation comprising a pre-stage and post-stage operation. The pre-stage DP operation is conducted with regard to the inputted digital voice data selected along a time axis and standard pattern data formed in advance in correspondence with voice and stored in a memory, thereby selecting several standard pattern data as the candidates. The post-stage DP operation is further conducted with regard to the inputted digital voice signals and the selected candidates of standard pattern data. Thus, the DP operation time of the present apparatus is shortened and a work area of a memory is decreased.

10 Claims, 17 Drawing Figures

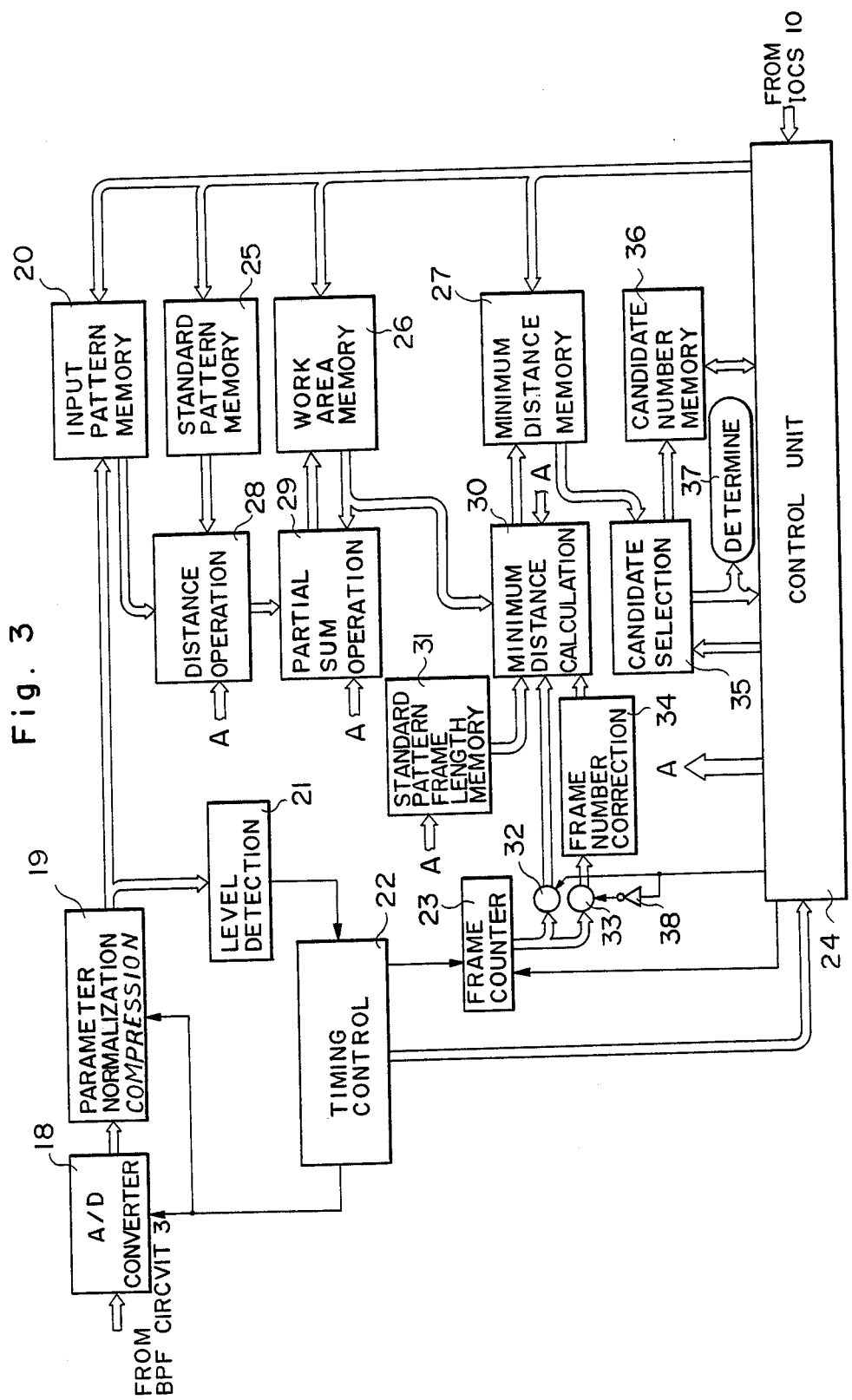

Fig. 4A  $A_1$

| | 1 | ... | $m_0-1$ | $m_0$ | $m_0+1$ | ... | W |
|---|---|---|---|---|---|---|---|
| 1 | 0 | ---- | 0 | $e^1(m_0,1)$ | 0 | ---- | 0 |
| 2 | 0 | ---- | 0 | $e^2(m_0,1)$ | 0 | ---- | 0 |
| --- | --- | --- | --- | --- | --- | --- | --- |
| n | 0 | ---- | 0 | $e^n(m_0,1)$ | 0 | ---- | 0 |

Fig. 4B  $A_4$

| | 1 | ... | $m_0-1$ | $m_0$ | $m_0+1$ | ... | W |
|---|---|---|---|---|---|---|---|
| 1 | 0 | ---- | $e^1(m_0-1,2)$ | $e^1(m_0,2)$ | $e^1(m_0+1,2)$ | ---- | 0 |
| 2 | 0 | ---- | $e^2(m_0-1,2)$ | $e^2(m_0,2)$ | $e^2(m_0+1,2)$ | ---- | 0 |
| --- | --- | --- | --- | --- | --- | --- | --- |
| n | 0 | ---- | $e^n(m_0-1,2)$ | $e^n(m_0,2)$ | $e^n(m_0+1,2)$ | ---- | 0 |

Fig. 4C  $A_{3S+1}$

| | 1 | ... | $m_0-1$ | $m_0$ | $m_0+1$ | ... | W |
|---|---|---|---|---|---|---|---|
| 1 | $e^1(1,S)$ | ---- | $e^1(m_0-1,S)$ | $e^1(m_0,S)$ | $e^1(m_0+1,S)$ | ---- | $e^1(W,S)$ |
| 2 | $e^2(1,S)$ | ---- | $e^2(m_0-1,S)$ | $e^2(m_0,S)$ | $e^2(m_0+1,S)$ | ---- | $e^2(W,S)$ |
| --- | --- | --- | --- | --- | --- | --- | --- |
| n | $e^n(1,S)$ | ---- | $e^n(m_0-1,S)$ | $e^n(m_0,S)$ | $e^n(m_0+1,S)$ | ---- | $e^n(W,S)$ |

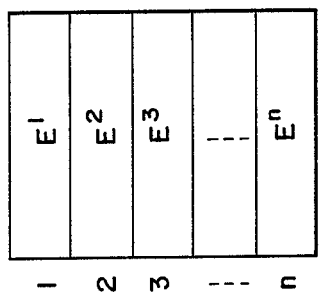
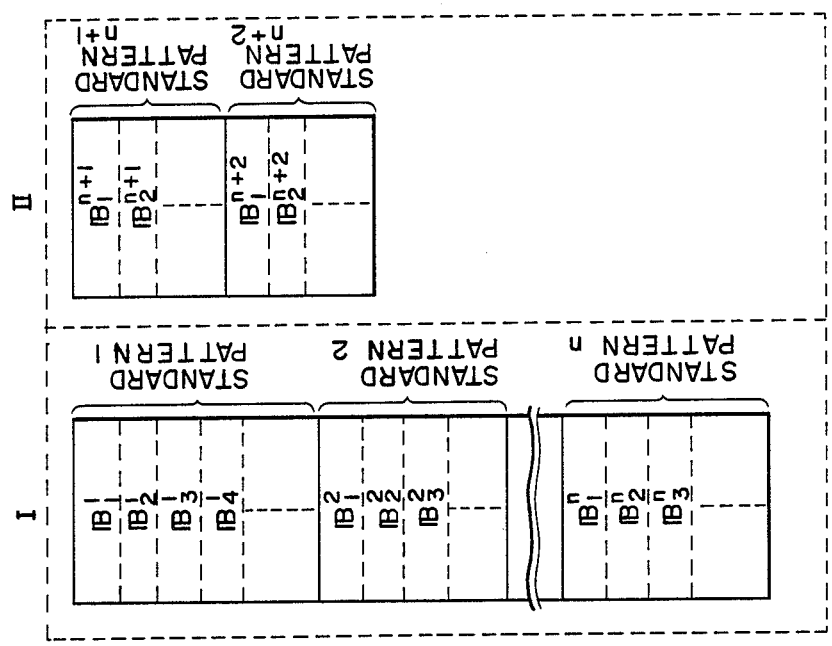
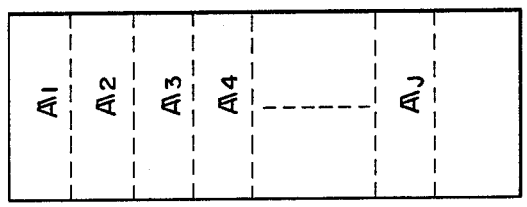

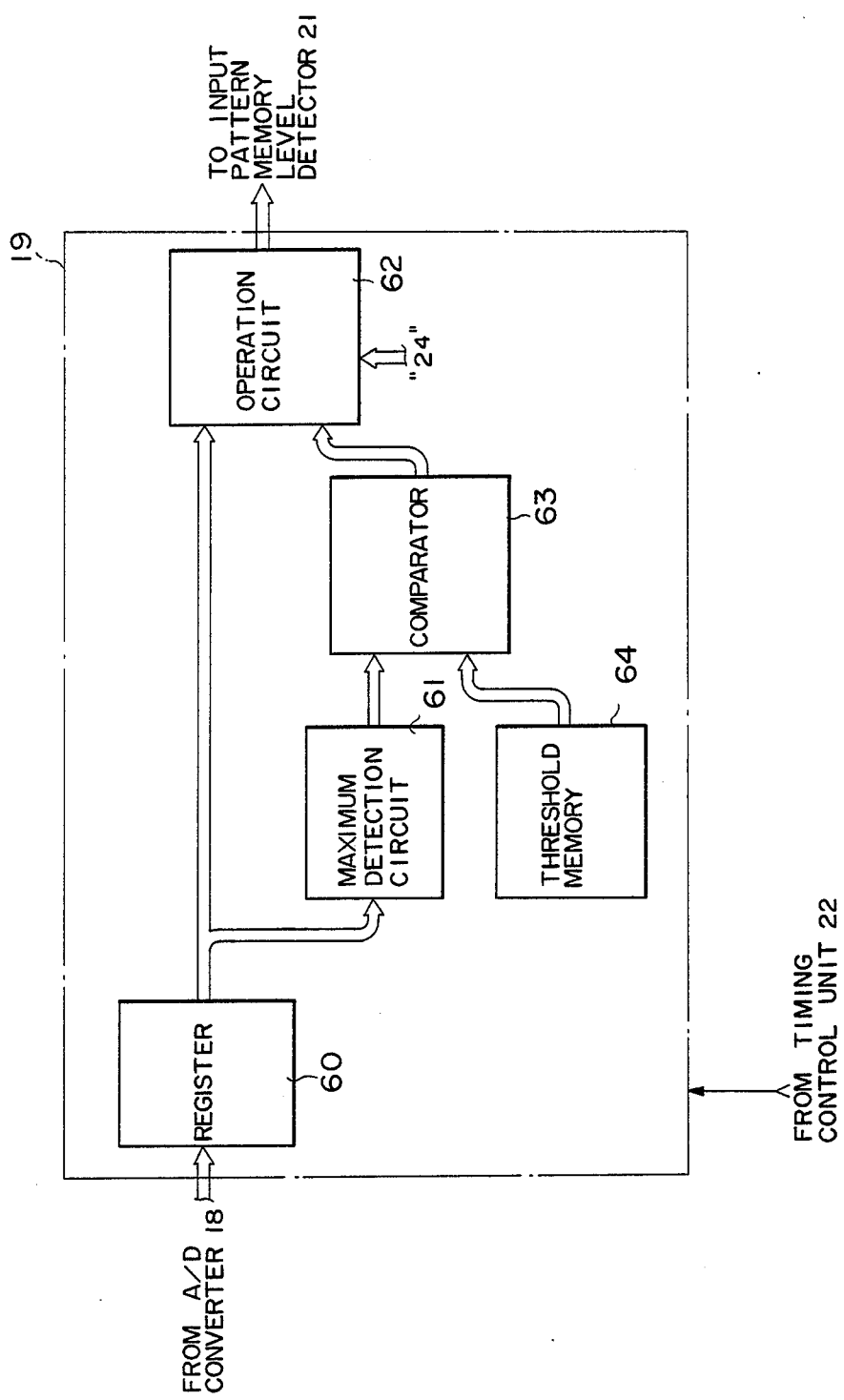

SPEECH RECOGNITION APPARATUS

BACKGROUND OF THE INVENTION

The present invention relates to a speech recognition apparatus for performing a two-stage dynamic programing matching operation.

Generally speaking, the speech recognition apparatus extracts a characteristic parameter of inputted speech and performs pattern matching between the characteristic parameter of the inputted speech and the pattern data stored in advance, thereby selecting the stored pattern data which is the most similar to the inputted speech pattern for the purpose of speech recognition.

A speech frequency spectrum is generally used as the characteristic parameter of the aforementioned speech input data and the frequency spectrum can be obtained by using many band pass filters or a high speed Fourier conversion. The frequency spectrum obtained by these method is compared with the patterns registered in advance, thereby detecting the degree of resemblance between the inputted speech and the registered standard pattern. Then, the standard pattern nearest to the inputted speech data is outputted as the inputted data.

When the aforementioned inputted data is compared with the registered pattern, time axises of these data are not always conformed to each other one by one, and they vary, depending on the relationship with words coming before and after the particular speech to be detected or depending on the length of the long vowel. As a method of obtaining the degree of resemblance of the patterns the time axis of which do not accord with each other one by one, namely, a method of performing a pattern matching, a dynamic programing (hereinafter abbreviated to DP) method is employed. Generally, the degree of the resemblance of two patterns is expressed as a distance concept.

The DP method has such a disadvantage that it detects the minimum distance between two characteristic points and thus, the operational time becomes longer as the number of the characteristic points is increased.

In order to remove the aforementioned defect of the DP method, the following method is conventionally used. First of all, the pattern itself is subject to a linear expansion and depression, and is preliminarily selected by a linear matching. As to the standard pattern thus selected, the standard pattern of the minimum distance is obtained, using the DP method.

The operation speed of the linear matching method is higher than the DP method and thus, the operation speed of the aforementioned method is higher than the method of performing the DP matching for all of the standard patterns. However, as this method performs a linear depression of the pattern, it is disadvantageous in that a feature of a nonlinear depression of the time axis inherent to the DP method is weakened. Furthermore, the linear matching used for a preliminary selection causes more errors in recognition than the DP method, with regard to a word of a longer continuation period, thereby failing to select a desired standard pattern.

On the other hand, a speech recognition apparatus detects the maximum value of the speech data at a predetermined period (one frame) and normalizes the data within one frame period. The normalization enables the number of the effective bits to decrease (i.e. depression) and shortens the time for a recognition operation.

Where 8 bit data is depressed to 4 bit data for the operation purpose, first of all, the maximum value of the input 8 bit data is obtained and the data is divided by the input data. Thus, the normalization is conducted, thereby causing the maximum value to be "1" and the other data to be less than "1". By multiplying the normalized data by 24, for example, the bits of the required number namely, 4 bits, are obtained. To be multiplied by $2^4$ is equivalent to a four bit shifting of the normalized data toward an upper digit.

Furthermore, the above-recited normalization process normalizes data using the maximum value of the input data, and a sum of input data may be used for a normalization.

Supposing that input data is A(n) and that the normalized result is a(n), the normalization method of using the maximum value is expressed as follows:

$$a(n)=A(n)/A \max \qquad (1)$$

The normalization method of using the sum value is expressed as follows:

$$a(n)=A(n)/\Sigma A(n) \qquad (2)$$

where A max designates the maximum value within one frame period.

The normalization methods expressed by the above-recited (1) and (2) equations have drawbacks such that the normalized result, namely, a(n) in the equations (1) and (2), does not reflect a level (power) information of speech at all.

In the speech recognition apparatus, a frame subject to normalization by using a low-level value, for example, a silent sound or consonant, and a frame of a produced sound are equally treated. Thus, the level information in the respective frames disappear, thereby resulting in an erroneous recognition.

SUMMARY OF THE INVNENTION

An object of the present invention resides in providing a speech recognition apparatus in which DP operation processing can be conducted within a short period and the memory area used is small.

Another object of the present invention is directed to a speech recognition apparatus in which the time necessary for recognition of particular words is shortened, and the number of errors in recognition is decreased.

A further object of the present invention is to provide a speech recognition apparatus in which useless data caused in a normalization process of a silent sound is prevented from expansion.

A feature of the present invention is to provide a speech recognition apparatus comprising a conversion means for converting speech signals to digital data, a first memory for storing the output of said conversion means, a second memory in which a plurality of standard patterns are stored, a first operation means for performing a DP operation of the output of the conversion means and said standard patterns selectively along a time axis, a selection means for selecting a plurality of said standard patterns stored in the second memory based on the result of the operation of the first operation means, and a second operation means for performing a DP operation of said standard pattern data selected by said selection means and data stored in the first memory.

Another feature of the present invention is to provide a speech recognition apparatus comprising a parameter extraction means for extracting a characteristic parameter of the speech, the first and second standard pattern memory for memorizing a standard pattern of the speech characteristic parameter beforehand, and a pattern matching means for performing a pattern matching operation between the output of said pattern extraction means and the content of the first and second standard pattern memory, thereby storing the result of the pattern matching, said first standard pattern memory storing a plurality of standard pattern data and said second standard pattern memory storing two or three kinds of standard patterns.

BRIEF DESCRIPTION OF THE DRAWINGS

FIG. 3 is a block diagram of another embodiment of the present invention, FIGS. 4a, 4b, 4c show a diagram of a data construction of a content of a work area memory in FIG. 3.

FIG. 10 is a block diagram of the parameter normalization compression unit of FIG. 3, FIGS. 11A and 11B show a characteristic curve designating the relationship between 8 bit input data and 4 bit output data in the parameter normalization and depression unit of FIG. 3.

DETAILED DESCRIPTION OF THE PREFERRED EMBODIMENT

Figure 1:
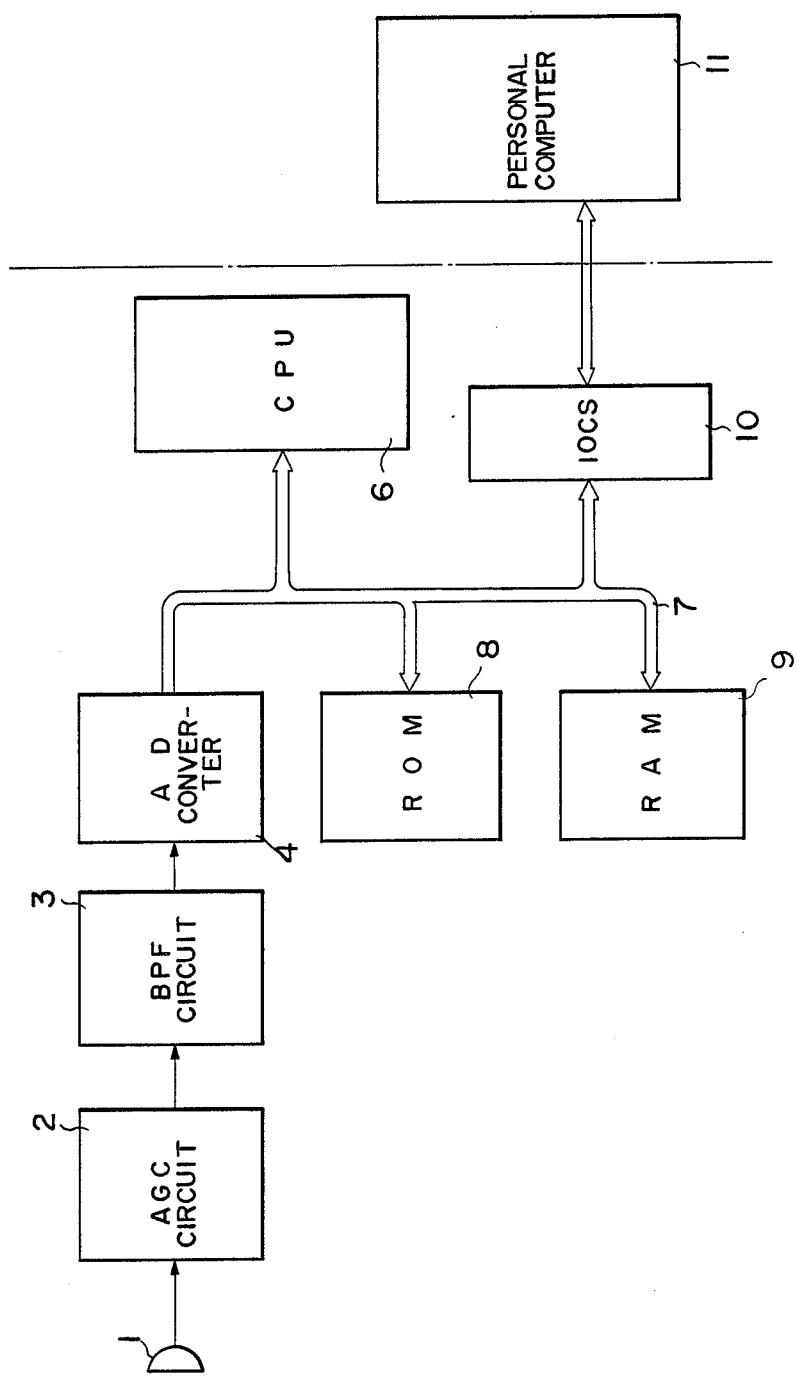
FIG. 1 shows a block diagram of one embodiment of the present invention for using a processor.

FIG. 1 is a block diagram of a first embodiment of the present invention in which a processor is used. A microphone 1 is connected to band pass filter (hereinafter called "BPF") circuit 3 through automatic gain control (hereinafter called AGC) circuit 2. The output of BPF circuit 3 is applied to analogue-to-digital (hereinafter called A/D) converter 4. A read only memory (ROM) 8, randam access memory (RAM) 9 and input and output control system (IOCS) 10 as well as A/D converter 4 are connected to bus line 7 connected to processor 6 (hereinafter called CPU). The input and output control system 10 is connected to other apparatuses, for example, personal computer 11. Speech or voice inputted into microphone 1 is converted into electric signals As the electric signals are different in level, depending on the loudness of speech and the distance between the mouth of the speaker and the microphone, the electric signals are added to AGC circuit 2 to obtain an almost constant level. The AGC circuit 2 changes its gain to keep the output thereof almost constant in level. The output of AGC circuit 2, namely, a voice signal of a constant level, is applied to BPF circuit 3. The BPF circuit 3 has a plurality of band pass filters for dividing a voice range into 8 ranges, thereby enabling the voice range to be divided into 8 specified ranges. The voice signal, divided into 8 different frequency ranges, is added to A/D converter 4, thereby converting the power, for example, of the voice signal in the respective frequency ranges, into a digital value. The A/D converter 4 converts one frequency range, namely, one channel of the output of BPF circuit 3, into 8 bit data, and 64 bit data in a total are delivered to bus line 7 by a unit of 8 bits.

The above-recited A/D converter 4 is controlled by CPU 6 through busline 7, and the above-mentioned data of 64 bits are divided by a unit of one channel and stored in RAM 9. The CPU 6 controls A/D converter 4 and to store data and in addition, it performs a normalization process of the data described hereinunder and a calculation process for using the DP method, namely, a DP operation and control for delivering the result of the operation to personal computer 11 through input and output control system 10. These operation and control are conducted by enabling CPU 6 to execute a program stored in ROM. RAM can be used as a work area at that time. The first standard pattern data comprising many component data, and the second standard pattern data comprising two or three component data are stored in RAM 9 connected to the bus line 7. It is determined by the control signal inputted from the input and output control system 10 whether the first standard pattern data is used or the second standard pattern data is used, thereby enabling a DP operation.

Figure 2:
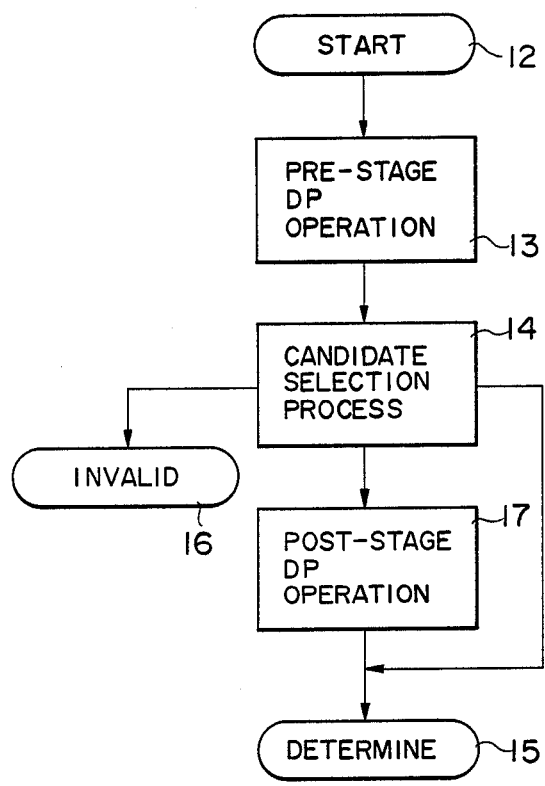
FIG. 2 is a flow chart of a DP operation of the embodiment shown in FIG. 1.

FIG. 2 is a flow chart diagram to explain the DP operation processing of CPU 6 of FIG. 1. When the data is inputted from the A/D converter 4, the DP operation processing starts (step 12). The CPU 6 of FIG. 1 starts by performing a pre-stage operation (step 13). The pre-stage DP operation (step 13) detects distance between input data and standard data stored in RAM 9. However, the operation is not performed as to all the input data but is conducted at a predetermined data interval, for example, at one timing out of three of the input data. The data measured at one timing comprises 64 bits in total, as described above. After a specific period passes, for example, after all the voice data of one word are inputted and all of the corresponding operations are completed, the CPU executes the next candidate selection processing (step 14). The pre-stage DP operation executed previously (step 13), executes a DP operation for one input datum out of three. Thus, the operation lacks precision as a matter of course. Therefore, a candidate selection processing (step 14) is conducted to again perform a DP operation with regard to that standard data which is the result of the measurement of the distance that has fallen within a specific range. However, when only single standard pattern data falls within the predetermined scope of distance through the pre-stage DP operation (step 13) in the selection processing, the processor does not perform the DP operation again but determines the standard pattern data as the input data (step 15), thereby delivering it to the personal computer 11 through the input and output control system 10 as shown in FIG. 1. When any standard pattern does not fall within the predetermined scope of the distance, the input data is not to be recognized, thereby resulting in invalid data (step 16). Furthermore, when the operational result obtained by using a plurality of standard patterns has fallen within a predetermined scope of distance and where the difference in distance between the input data and the first candidate has fallen within a specific scope, the five standard pattern, for example, which are obtained by counting the patterns from the pattern of the minimum distance to the fifth pattern in the order of distance, are selected as candidates. When only less than five patterns fall within the predetermined scope of the difference in distance, the patterns of such number are selected as candidates. When a candidate is determined, the processing circuit terminates the candidate selection process (step 14) and performs the post-stage DP operation (step 17). In the pre-stage operation (step 13), an operation is conducted by using the data and the standard pattern data positioned along a time axis, at one timing out of three. The post-stage DP operation (step 17) is conducted to obtain the minimum distance with regard to all the selected standard pattern data. Following this CPU determines the standard pattern data having the minimum value of the minimum distances of the selected standard patterns as the data which accords with the input data (step 15), thereby delivering it as the output thereof.

In FIG. 2, the post-stage DP operation is conducted (step 17) with regard to all the standard pattern data along a time axis, and at that time, the number of standard pattern data is five at the maximum. Therefore, the operation time for performing step 17 is much shorter than that for performing the operation with regard to all the standard patterns. If there are 64 standard patterns, the operation time is shortened to a maximum of 5/64. Furthermore, the pre-stage DP operation is conducted at one timing out of three and thus the number of pre-stage DP operations is much smaller than that of the operations conducted with regard to all the data of a single standard pattern.

FIG. 3 shows a block diagram of the second embodiment of the present invention. In FIG. 1 the CPU in the embodiment of the present invention performs the operation and control. In the embodiment shown in FIG. 3, the circuits perform all the controls and operations. The output of BPF circuit 3 as shown in FIG. 1 is added to an A/D converter 18, and the output thereof is applied to level detector unit 21 and input pattern memory 20 through parameter normalization and compression unit 19. The detection output of level detector unit 21 is applied to timing control unit 22. The control output of timing control circuit 22 is applied to A/D converter 18, and parameter normalization compression unit 19, frame counter 23 and control unit 24. An address output delivered from control unit 24 is applied to input pattern memory 20, standard pattern memory 25, work area memory 26 and minimum distance memory 27.

The output of input pattern memory 20 and standard pattern memory 25 is applied to distance operation unit 28, the output of which is supplied to work area memory 26 through partial sum operation unit 29. The output of work area memory 26 is applied to partial sum operation unit 29 and minimum distance calculation unit 30. Besides this, the output of standard pattern frame length memory 31 is applied to minimum distance calculation unit 30 and the output of frame counter 23 is added to minimum distance calculation unit 30 through gate circuit 32 or gate circuit 33 and frame number correction unit 34. The output terminal of minimum distance calculation unit 30 is connected to the input terminal of minimum distance memory 27 and output terminal of the minimum distance memory 27 is connected to the input terminal of candidate selection unit 35. The output of candidate selection unit 35 is applied to candidate number memory 36 and control unit 24, and furthermore, is outputted as the determined result 37. The candidate number memory 36 is connected to control unit 24. The control output of control unit 24 is added to distance operation unit 28, partial sum operation unit 29, minimum distance calculation unit 30, standard pattern frame length memory 31, and candidate selection unit 35. Furthermore, the control signal of cohtrol unit 24 is applied to a control terminal of gate circuit 32 and a control terminal of gate circuit 33 through inverter 38. In the drawing, the arrow A is connected to the corresponding arrow A.

Signals applied to A/D converter 18 and divided into the respective frequency ranges are converted to digital signals, thereby being applied to the parameter normalization and compression unit 19. In the parameter normalization andcompression unit 19, the input data is normalized by using the value obtained by adding "1" to the maximum value and converting it into the number of bits necessary for processing; namely, the bit number other than the effective bit number is omitted when the maximum value is other than a specific value, the input data is normalized by using the specific value and converting it into the bit number necessary for processing, as discribed above. The data converted into a predetermined bit number is stored in memory 20. The level detector 21 detects whether the data processed by the aforementioned parameter normalization compression unit 19 is more than the predetermined value, namely, the threshold level value TH or not. The timing control unit 22 performs a switching operation of timing signals based on the result obtained by level detector unit 21. This is conducted to quickly detect the starting portion of speech period TS described later in FIG. 6 where A/D converter 18 and parameter normalization and compression unit 19 operate. Thus, A/D converter 18 and parameter normalization compression unit 19 operate at a timing of a fast clock $T_{PS}$ where the inputted parameter, namely the data $D_a$ is less than the threshold level TH, or at a timing of a slow clock where, it is more than the threshold level TH. (speech interval). The data obtained by the aforementioned operation is stored in pattern memory 20 during the speech interval TS. Similar to the process of using the processor shown in FIG. 1, the embodiment shown in FIG. 3 performs a pre-stage and post-stage operation which are conducted by circuits in the embodiment of FIG. 3. For example, in the pre-stage DP operation, the operation is conducted at such a rate as to select one out of three, thereby determining a candidate of a standard pattern stored in standard pattern memory 25. In the post-stage operation, all of the input data and candidate pattern data are used, thereby allowing the DP operation to be conducted. The control unit 24 determines whether the pre-stage DP operation or the post-stage DP operation is conducted. The pre-stage and post-stage DP operations are different only in the way of accessing input pattern memory 20, standard pattern memory 25 and work area memory 26. The distance operation unit 28, partial sum operation unit 29, and minimum distance calculation unit 30 associated with the DP operation operate in the pre-stage operation in the same manner as the post-stage operation. As described in FIG. 1, the pre-stage operation does not perform the DP operation with regard to all the data but performs it with regard to only one out of three, which is made possible by the effect of the addresses of the respective memories being produced from the control unit 24 in a different manner. The distance operation unit 28, partial sum operation unit 29, and minimum distance calculation unit 30 are associated with the DP operation as described above. To start with, the DP operation can be explained by using an equation. Let us suppose that the input pattern A and standard or reference pattern B are expressed as follows.

$$A = A_1, A_2, \ldots A_j \qquad (1)$$

$$B = B_1, B_2, \ldots B_i \qquad (2)$$

$A_1-A_j$, $B_1-B_i$ show a characteristic vector at a certain time. The characteristic vector at a certain time is the vector having eight dimensions (the speech or voice period is divided into eight portions) in the present invention. These vectors are expressed as follows:

$$A_j = (a_{j1}, a_{j2}, \ldots, a_{j8}) \qquad (3)$$

$$B_i = (b_{i1}, b_{i2}, \ldots, b_{i8}) \qquad (4)$$

The partial sum g(i, j) in the DP operation is generally expressed as follows:

$$g(1, 1) = 2d(1, 1)$$

$$g(i, j) = \min \begin{cases} g(i-1, j) + d(i, j) \\ g(i-1, j-1) + 2d(i, j) \\ g(i, j-1) + d(i, j) \end{cases}$$

$$i, j \geq 2$$
$$j - dw \leq i \leq j + dw$$

where d(i,j) is the distance between the characteristic vectors and is defined as follows:

$$d(i,j) = \sum_{k=1}^{8} |b_{ik} - a_{jk}| \qquad (5)'$$

dw shows a window width on one side. Supposing that the window width is W, W=2dw+1.

The aforementioned equation (5) expresses a partial sum in the DP operation and the distance between patterns is given by g(I,J). In the case of speech recognition and so on, the input times of the input pattern data and standard pattern data are different, namely, I and J in the equations (1) and (2) are not constant, and thus, it is necessary to normalize those data using adequate sampling numbers. The sampling numbers are different depending on both the input and standard pattern data in the present invention and thus, the final pattern distance G(I,J) is expressed as follows:

$$G(I,J) = \frac{1}{I+J} \cdot g(I,J) \qquad (6)$$

On the other hand, the operation is conducted in the embodiment of FIG. 3 through a variable conversion. Namely, $$i = m + j - dw - 1 \qquad (7)$$

where $1 \leq m \leq w$ $$l = j \qquad (8)$$

$$l' = j - 1 \qquad (9)$$

The operation is then executed by using an equation associated with m, l, and l'. When the equations (7) to (9) are substituted for equations (5) and (6) and the conversion takes place, the following is achieved:

$$e(dw + 1, 1) = 2d(1,1) \qquad (10)$$
$$e(m,l) = Q = \infty, \, m \neq dw + 1, \, 1 \leq m \leq w \qquad (10)'$$

$$e(m,l) = \min \begin{cases} e(m-1,l) + d(m,l) \\ e(e,l') + 2d(m,l) \\ e(m+1,l') + d(m,l) \end{cases}$$

$$1 \leq m \leq W$$
$$l = j$$
$$l' = j - 1 \qquad (11)$$

The final pattern distance E(M,L) after the conversion is expressed is as follows:

$$E(M,L) = \frac{1}{I+J} \cdot e(M,L) \qquad (12)$$

where $$M = I - J + dw + 1 \qquad (13)$$

$$L = J \qquad (14)$$

In the equation (10)', e(m,l) is given as infinite, where $m \neq dw+1$, $1 \leq m \leq W$. In order to store the minimum data of the equation (11) in the memory, the maximum value is stored at the same time as, or before the operation.

The description in FIG. 3 continues as follows. The distance operation unit 28 obtains a distance d(i,j) between the characteristic vectors. Namely, the operation of the equation (5)' is conducted based on respective data inputted from input pattern memory 20 and standard pattern memory 25. The result of the operation is outputted to the partial sum operation unit 29. The partial sum operation unit 29 performs the operation of the equations (10) and (11) based on the operational result obtained from distance operation unit 28 and data obtained from the work area memory 26.

The pre-stage operation is carried through at a rate of one out of three characteristic vectors. Namely, the operation is conducted only with regard to the input data $A_1, A_4, \ldots, A_{3p+1}$. $B_1, B_4, \ldots, B_{3p'+1}$ are read out from standard pattern memory 25 at a rate of one out of three standard pattern data, thereby effecting the operation.

All the data is used for the post-stage DP operation.

FIG. 4 is a data construction diagram showing the contents of work area memory 26. The contents of the data is the result of the pre-stage DP operation. The pre-stage DP operation is conducted at a rate of one out of three input data, namely, characteristic vectors. The operation is executed only with regard to the input data $A_1, A_4, \ldots,$ and $A_{3p+1}$. Likewise, as for the standard pattern data, $B_1, B_4, \ldots, B_{3p'+1}$ are read out from standard pattern memory 25 at a rate of one out of three, thereby effecting the operation.

At the same time when $A_1$ is inputted and stored in input pattern memory 20, the input is applied to the distance operation unit 28, thereby causing the distance between $A_1$ and $B_1$ to be detected. The result is stored in the work area memory 26. As a plurality of (namely, n) pattern data are stored in standard pattern memory 25, the respective corresponding results, namely, $e^1(m,l), \ldots,$ and $e^n(m,l)$, are stored in the m columns on rows 1 to n (FIG. 4A). Subsequently, $A_2$ and $A_3$ are inputted and stored in input pattern memory 20, but they are not subject to the operation as the prestage DP operation is conducted at a rate of one out of three. In $A_4$, the operation of obtaining d(m,l) is executed, thereby delivering the operational result to the partial sum operation unit 29. The partial sum operation unit 29 utilizes the data in column m to perform the operation of the equation (11) with regard to the respective ones. As for the operation of $A_4$, the maximum value other than the $m_0$ column of work area memory 26 is stored, and thus, $m_0-1$ and $m_0+1$ columns store $e^1(m_0-1,2)$, ..., $e^n(m_0-1,2)$ and $e^1(m_m+1,2)$, ..., $e^n(m_0+1,2)$ (FIG. 4B). The partial sum operation 29 performs the operation of the equation of (11). The minimum value among $e(m-1,1)+d(m,l)$, $e(m,l')+2d(m,l)$, $e(m+1,l')+d(m,l)$ is given as e(m,l). Thus, at this time, even if either the m+1 operation or m−1 operation is the maxmum value Q, one of the remaining two equations is the minimum and then, Q is rewritten.

The input pattern data, manely, A is sequentially added thereto, thereby causing the distance to be obtained by distance operation unit 28 and causing e(m,l) to be obtained through a partial sum operation. The afore-mentioned operation is conducted with regard to every kind of standard pattern data (1 to n) (FIG. 4C). In FIG. 4C, $e^n(m,s)$ designates a distance to the n-th standard pattern.

The minimum distance caluculation portion 30 operates afterthe speech interval terminates. The minimum distance calculation portion 30 obtains the minimum distance data of the standard pattern data from the distance data in work area memory 26, namely, E(M,L) of the afore-mentioned equation (12). To start with, e(M,L) corresponding to M, L satisfying the equations (13) and (14) is obtained from work area memory 26. Data I outputted from the standard pattern frame length memory are added to data J outputted from frame counter 23 and the sum of the addition divides e(M.L), thereby to cause the quotient to be stored in minimum distance memory 27. In the case of pre-stage processing, the ratio of frame length of input pattern to standard pattern is about one third. As I and J are integers and cannot always be divisible by 3 (I/3)+1 and (J/3)+1 are outputted from standard pattern length memory 31 and frame number correction unit 34 when both I and J are multiples of 3, {(I−1)/3}+1 and {(J−1)/3}+1 are outputted therefrom when they are multiples of 3 plus 1, and {(I−2)/3}30 1 and {(J−2)/3}+1 are outputted therefrom when they are multiples of 3 plus 2.

In this manner I/3 and J/3 are related to a pre-stage processing. In the case of the post-stage process, I is supplied from the standard pattern frame length memory 31 and J is delivered from frame counter 23, thereby allowing 1/(L+M) e(M, L) to be operated.

The candidate selection unit 35 detects the minimum value from the minimum distances to the standard pattern data stored in the minimum distance memory 27, thereby storing the pattern number (1−n in FIGS. 4A to 4C) corresponding to the standard pattern data in candidate selection memory 36. Like the aforementioned two-stage DP operation of using the processor as described before, the candidate selection unit 35 operates in a different manner depending on the condition. Where a distance of only one single standard pattern data has fallen within a predetermined scope, the determined result, such as the pattern data, is delivered from terminal 37 as the determination factor. The result is delivered to input and output system 10 through control unit 24. At this time, control unit 24 does not perform the control of the post-stage DP operation process and waits for the next input pattern data to be inputted. If any input data has not fallen in a predetermined scope of distance, control unit 24 delivers the output designating that the input data can not be recognized. On this occasion, control unit 24 delivers data which designates that the recognition is not possible, to input and output control system 10, where the operation result obtained by using a plurality of patterns has fallen within a predetermined distance and the difference in distance between the data and the first candidate has fallen within a specific scope, the data obtained by counting the five patterns from the minimum distance pattern can be selected as the candidates. Where only a less than five difference data in distance between the input data and the first candidate falls within the predetermined scope, data of such a number is selected as the candidates.

Namely, in this case, two to five numbers are stored in candidate number memory 36. The number is stored in candidate number memory 36 only when the pre-stage process is conducted. In the post-stage operation, candidate selection unit 35 detects minimum value and then transmits the number to control unit 24. The above-recited distance operation unit 28, partial sum operation unit 29, minimum distance calculation unit 30 and candidate selection unit 35 are respectively and commonly used in the pre-stage and post-stage operations.

The level detection unit 21 detects the level of parameter normalization compression unit 19; namely, determining whether or not a parameter Da is more than a predetermined value (namely, the threshold level TH) By detecting that the parameter Da is over the threshold level TH, the clock $T_{ps}$ is changed to $T_s$, thereby allowing the DP operation process to start. Conversely, if it is detected that the parameter Da is less than the predetermined value during the operation process, the candidate is saved. The timing control unit 22 controls these timings.

Figure 5:
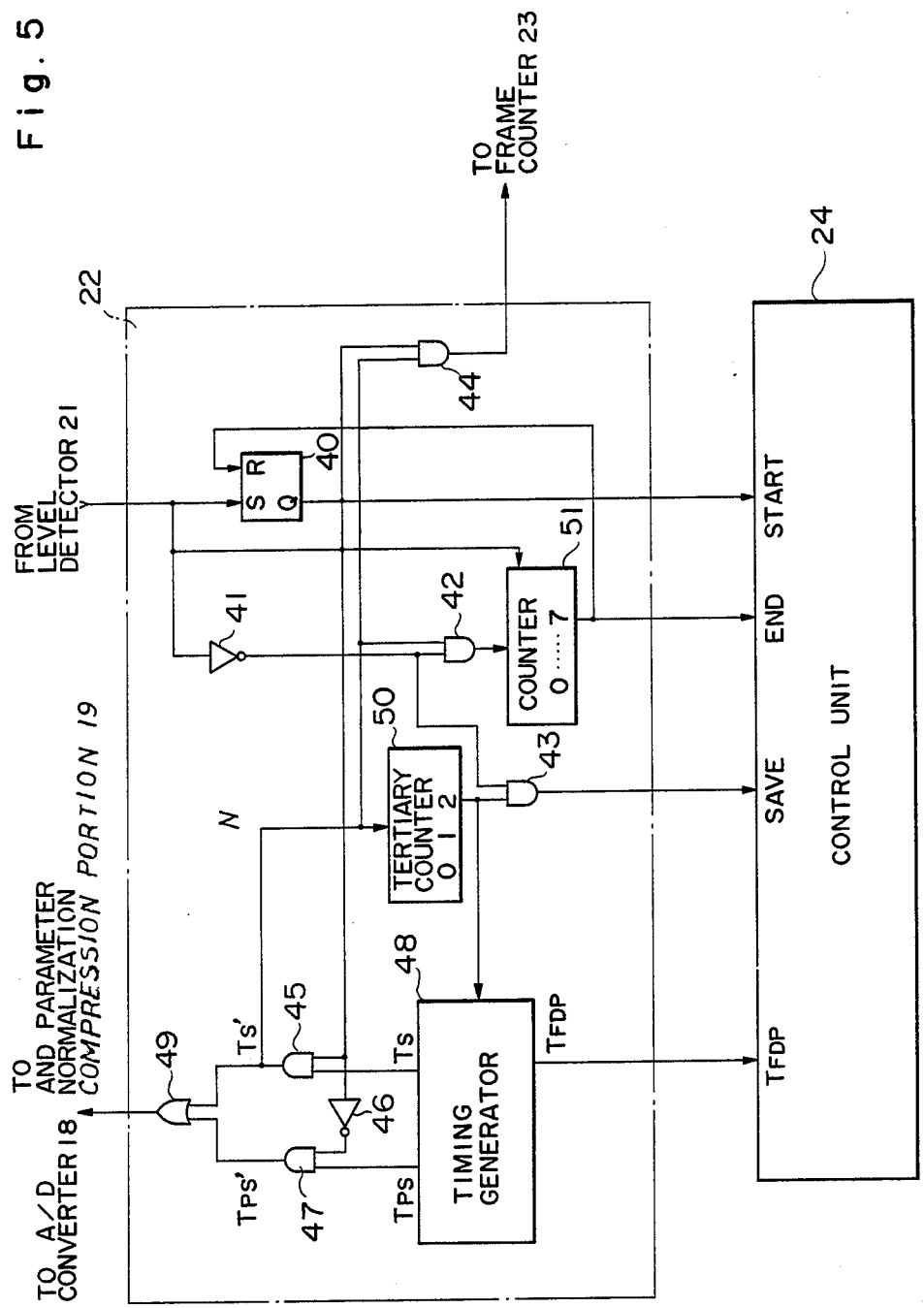
FIG. 5 is a block diagram of a timing control unit in FIG. 3.

FIG. 5 is a detailed circuit of timing control unit 22. The detection signal from level detection circuit 21 is applied to the set terminal S of flip-flop 40 and reset terminal R of counter 51, and the gate of AND gates 42 and 3 through inverter 41. The output Q of flip-flop 40 is supplied to AND gate 47 through AND gates 44 and 45 and inverter 46. The clock outputs $T_s$ and $T_{ps}$ of timing generation unit 48 are supplied to OR gate 49 through AND gates 45 and 47. The output of OR gate 49 is connected to A/D converter 18 and parameter normalization and compression unit 19. The output Ts' of AND gate 45 is applied to the input of ternary counter 50 and the gates of AND gates 42 and 44. The output of AND gate 44 is connected to frame counter 23. The output of AND gate 42 is applied to counter 51 and the No. 7 output of counter 51 is applied to reset terminal R of flip-flop 40 and is supplied to control unit 24 as the input of the end terminal thereof, The clock output of timing generator 48, the output of AND gate 43 and the output Q of flip-flop 40 are applied to control unit 24. The No. 2 output of counter 50 is connected to timing generator 48 and AND gate 43.

Figure 6:
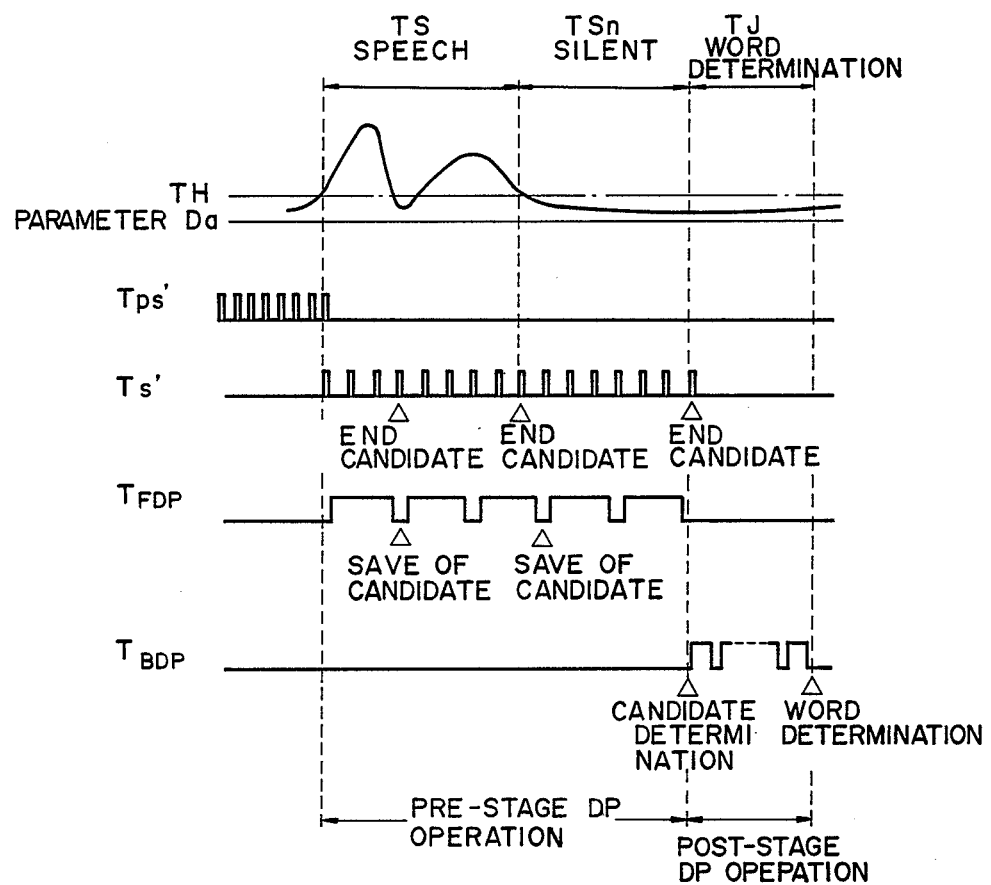
FIG. 6 is a timing chart of the timing control unit in FIG. 3, FIGS. 7A, 7B and 7C are diagrams, respectively showing the contents of an input pattern memory, a standard pattern memory, and a minimum distance memory.

FIG. 6 is a timing chart of timing control unit 22. The operation of a timing control unit can be explained by referring to FIG. 6.

When the flip-flip 40 is in a reset state, the output Q thereof is kept at a low level (L level), AND gates 44 and 45 are turned to "off". As the signal is applied to inverter 46, the output of inverter 46 is turned to a high level (H level). As the output of inverter 46 is applied to AND gate 47, AND gate 47 is turned to "on", thereby allowing clock $T_{ps}$ generated by timing generator 48 to be delivered as the output through AND gate 47 and OR gate 49. The clock $T_{ps}'$ shown in FIG. 6 designates the output of AND gate 47. When the parameter $D_a$ become larger than the threshold level, the output of level detector unit 21 is turned to a H level, thereby allowing flip-flop 40 to be set and allowing counter 51 to be reset. This causes the output of flip-flop 40 to be at H level and the count value of counter 51 to be at 0. When the output of flip-flop 40 reaches "H" level, AND gate 47 is turned to "off" and AND gates 44 and 45 are turned to "on". This allows the clock $T_s$ generated by timing generator 48 to be outputted through AND gate 45 and OR gate 49. A clock $T_s'$ in FIG. 6 shows the output of AND gate 45. As the output of OR gate 49 is the respective clock terminals of A/D converter 18 and parameter normalization and compression unit 19, the timing thereof is controlled by the clock $T_{ps}$ below the threshold level and is controlled by the clock $T_s$ over threshold level. For example, supposing that the frequency ratio of clocks $T_s$ to $T_{ps}$ is 1 to 3, a low level is read out at a clock three times that of $T_s$ and signal over the threshold level are subject to a sampling at clock $T_s'$, thereby allowing the read-out signals to be used as data for a DP operation. This is conducted to effectively obtain the recognition pattern information right after threshold level TH. Where such a control is not conducted, or in other words, where signals are always sampled at clock $T_s'$, the following defect will be caused; namely, when the level of the input signal reaches a high level between two adjacent clocks, such data signals can not be detected immediately, and thus, the data appearing right after such a situation is lost. As the output of the AND gate (clock T) is also applied to counter 50, the output signal of counter 50 (the frequency of which is divided into one third as counter 50 is a ternary counter) is inverted through timing generation 48 to be applied to control unit 24 as the signal $T_{FDP}$. The $T_{FDP}$ signal constitutes a clock for the circuit shown in FIG. 3 to perform a DP operation. As AND gate 44 is turned to "on", the clock $T_s'$ is outputted to be added to frame counter 23. As the output Q of flip-flop 40 is applied to the start signal terminal of control unit 24 and when flip-flop 40 is turned to "H" level control unit 24 starts the control of the DP operation.

On the other hand, let us consider the case where the level of a speech signal or other signals falls down temporarily. For example, in the case of the Japanese word, GAKKO (school), "AKK" produces a syllabic nasal and the sound level drops. However, if this is treated as the end of the voice, it will cause an error in recognition. Thus, by detecting that level of the voice falls for a specific time interval, the recognition can be conducted. Such a specific time interval is detected by counter 51. When flip-flop 40 is in a set status and level dector unit 21 is at a low level, a reset status of counter 51 is cleared, the H level is applied through inverter 41 and AND gate 42 is turned to "on". This allows the clock generated through AND gate 45 to be applied to counter 51. Counter 51 is an octal counter and No. 7 output is turned to "H" level when seven clocks are added to counter 51 after the reset status is cleared. Before seven clocks are added level detector 21 is turned to "H" level again, thereby enabling counter 51 to be reset. Subsequently, when signals supplied from level detector 21 are at a L level, a similar operation will be repeated. When counter 51 counts 7 clocks, No. 7 output is turned to "H" level, thereby allowing flip-flop 40 to be reset and to be returned to it's initial status. The No. 7 output of counter 51 is applied to the terminal for the final determination of control unit 24, and control unit 24 performs a post-stage DP operation. On the other hand, as signals of level detector unit 21 are applied to gate 43 through inverter 41, "H" level is applied to gate 43 when the signals of level detector 21 is turned to "L" level and the output of counter 50 is applied to control unit 24 as the save signals. The save signal, namely, the output signals, of AND gate 43 are delivered to control unit 24 in synchronization with the output of counter 50 when level detector 21 produces "L" level signals. Then, control unit 24 performs a save operation for a candidate. The save means that the resulting data of a partial sum operation in the DP operation stored in work area memory 26, is read out, a final operation is conducted with regard to the number of rows corresponding to the number (1−n) of the standard patterns in minimum distance calculation unit 30 and that a candidate is determined by candidate selection portion 35. This thereby enables the selceted candidate to be stored in candidate number memory 36. It may be possible to perform the save operation when seven clocks appear after the output of level detector 21 is turned to "L" level. However, it is made possible by conducting the save operation during a period of "L" level detection, namely, the aforementioned period of seven clocks, to allow the determination of an end terminal and to perform a post-stage DP operation, and thus, the time period required for the total process can be shortened further in the embodiment of the present invention. As shown in the timing chart in FIG. 6, a temporary levelling down is detected during a speech period, thereby causing the save and the subsequent level is turned to "H" level, thereby allowing the prestage DP operation 15 to be executed again. During a silent interval $TS_n$, the save of the candidate is conducted again and the end terminal is detected at the seventh clock, thereby allowing the candidate to be determined. The pre-stage DP operation is conducted in both the speech interval TS and silent interval $TS_n$ and the post-stage DP operation is conducted between the candidate determination and word determination. The interval for determining the word constitutes word determination interval TJ. The clocks $T_{BDP}$ and $T_{FDP}$ are for pre-stage and post-stage DP operations and control unit 24 controls the respective operation units in synchronism with such clocks.

Now we can return to FIG. 3, for further explanation. The clocks generated at timing control unit 22 and inputted into frame counter 23 are counted by frame counter 23. The counter 23 detects a frame number of input pattern data. The output of frame counter 23 is applied to gates 32 and 33. When the output signal of control unit 24 is applied to the control terminal of gate 32 and a control terminal of gate 33 through inverter 38, gates 32 and 33 are constructed so that either gate 32 or 33 is always kept in an "on" state. In the case of the DP operation, the L level is outputted from control unit 24, thereby allowing gate 33 to be turned to "on" and the output of frame counter 23 to be supplied to frame number correction unit 34 through gate 33. As described above frame number correction circuit 34 divides the value of the frame counter into about one-third. Thus, it produces $(J/3)+1$ when the input J is 3U (U is an integer), produces $\{(J-1)/3\}+1$ when the input J is 3U+1, and produces $\{(J-2)/3\}+1$ when the input J is 3U+2. The output is used in minimum distance calculation unit 30 during the prestage DP operation. On the other hand, during the poststage DP operation, gate 32 is turned to "on" and gate 33 is turned to "off", thereby allowing the output J of frame counter 23 to be applied to minimum distance calculation unit 30 without any change.

It is controlled by control unit 24 whether the pattern frame length memory 31 performs a pre-stage DP operation or a post-stage DP operation. The value associated with the frame number L of the respective relative standard patterns is applied to minimum distance calculation unit 30. Namely, during a pre-stage operation $(I/3)+1$ is outputted when I is 3U' (U' is an integer), $\{(I-1)/3\}+1$ is produced when I is 3U'+1 and $\{(I-2)/3\}+1$ is outputted when I is 3U'+2. I changes in accordance with a standard pattern data $(1-n)$ stored in standard pattern memory 25.

FIGS. 7A, 7B and 7C show a data construction diagram designating contents of input pattern memory 20, standard pattern memory 25, and minimum distance memory 27.

In FIG. 7A, the respective characteristic vectors $A_1-A_j$ of the input pattern data are sequentially stored in input pattern memory 20 at a clock $T_s'$. Then standard pattern data obtained in advance is stored in standard pattern memory 25. According to the above-recited circuit operation, in the pre-stage DP operation, the distance between $A_1, A_4, A_7, \ldots, A_{3U+1}$, and $B_1^1, B_4^1, B_7^1, \ldots, B_{3U'+1}^1$ and the distance between $A_1, A_4, A_7 \ldots A_{3U+1}$ and $B_1^2, B_4^2, B_7^2 \ldots, B_{3U'}^2$, and the distance between $A_1, A_7, A_7, \ldots, A_{3U+1}$ and $B_1^n, B_4^n, B_7^n, \ldots, B_{3U''+1}^n$ are obtained each time characteristic vector $A_n$ is received. Then, the operation of obtaining the partial sum is performed and the result of the partial sum is stored in work area memory 26. The upper number n of $B_x^n$ described above corresponds to the number of the standard pattern. Further, the standard pattern memory 25 comprises a groupe I of $1-n$ standard patterns and a group II of two standard patterns $n+1$ and $n+2$ as shown in FIG. 7B. The group I is used for the two-stage DP matching described above, and the group II is used for selecting one of two data, for example, either "yes" or "no". When the group II is used, control unit 24 selects group II and does not perform the candidate selection and the post-stage operation, and the pattern with the minimum number is selected, thereby enabling the number thereof to be outputted as the result. The result of the partial sum operation stored in work area memory 26 is subject to the minimum distance calculation and then, stored in minimum distance memory 27 as shown in FIG. 7C. The upper figure n of $E^n$ in FIG. 7C corresponds to the number of the standard patterns.

Figure 8:
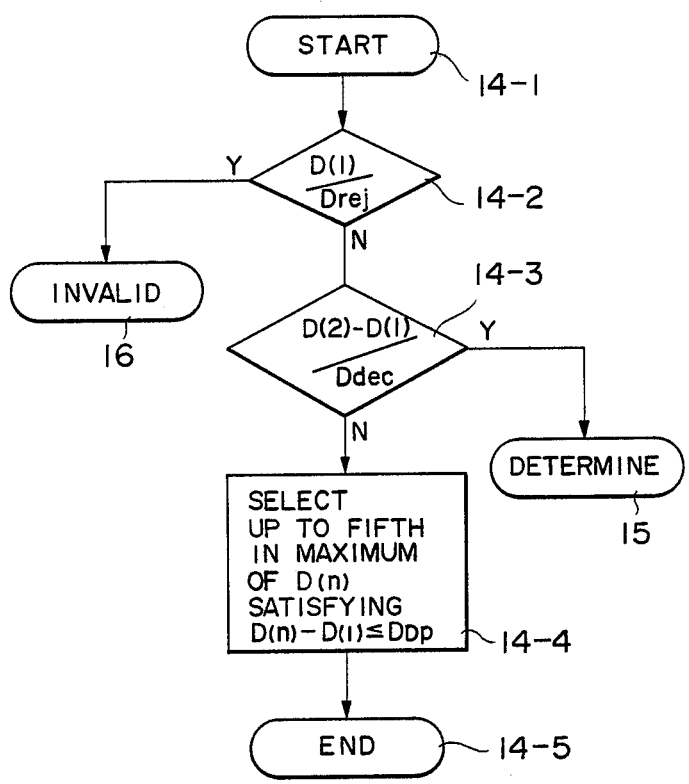
FIG. 8 is a flow chart for designating a process of selecting a candidate in the processor.

FIG. 8 shows a flow chart for designating the candidate selection process (step 14) of the processor circuit of FIG. 2 more in detail. After the process starts (step 14-1), the processor detects the minimum distance D(1) with regard to the standard patterns and compares it with the first specific value $D_{rej}$ (step 14-2), namely, $D_{rej}$ is subtracted from D(1) and it is determined whether or not a carry is produced. When there is no carry and $D(1) \geq D_{rej}$ (Y), the input data is invalidated by the processor (step 16). This means that there is a high possibility that a standard pattern to be obtained does not exist, even if the post-stage DP operation is conducted, for that distance between the input data and standard pattern which is obtained from the pre-stage operation is too large. The first specific value $D_{rej}$ constitutes a threshold value. When a carry exists and $D(1) < D_{rej}$ (N), the processor determines whether the difference between the second minimum distance D(2) and $D_{rej}$ is more than the second specific value $D_{dec}$ (step 14-3). The erros in the pre-stage DP operation is larger than that in the post-stage DP operation. However, when the difference between the first candidate, namely, a standard pattern with the distance D(1), and the second candidate, namely, a standard pattern with the distance D(2), is more than the second specific value $D_{dec}$ the order of the candidates does not change, even if the post-stage operation is conducted. Thus, when the difference more than the second specific value exists, CPU decides that the first candidate has established a coincidence (step 15), namely, the processor determines the first candidate as the input data as the first candidate satisfies the equation $(D(2)-D(1)) \geq D_{dec}$.

If the difference between D(2) and D(1) is small, the pre-stage process is considered to produce some errors. The processor selects the first to fifth candidates to obtain such a candidate of a minimum distance. D(n) that the difference between the minimum distance D(1) of the first candidate and that D(n) of the candidate is less than the third specific value $D_{DP}$. In other words, CPU selects the first to fifth standard patterns counted from the standard pattern the minimum distance of which is the minimum value among the standard patterns having such a minimum distance that the difference between the minimum distance of the first candidate and that of the standard pattern is less than the third specific value $D_{DP}$. When the aforementioned selection process (step 14-4) is completed, the processor ends (step 14-5) its candidate selection process 14.

In FIG. 2, the post-stage operation (step 17) is conducted with regard to all the data of the standard pattern along a time axis. Then, the number of the standard patterns has already been limited to five at the maximum and thus, the operation time of the post-stage operation is much shorter than that required for all the standard patterns. Where the number of the standard patterns are 64, for example, the operation time is shortened to 5/64 at the maximum. The pre-stage DP operation is conducted at one timing out of three and the operation time is much shorter as compared with the case where the operation is conducted with regard to all the data of one standard pattern.

Figure 9:
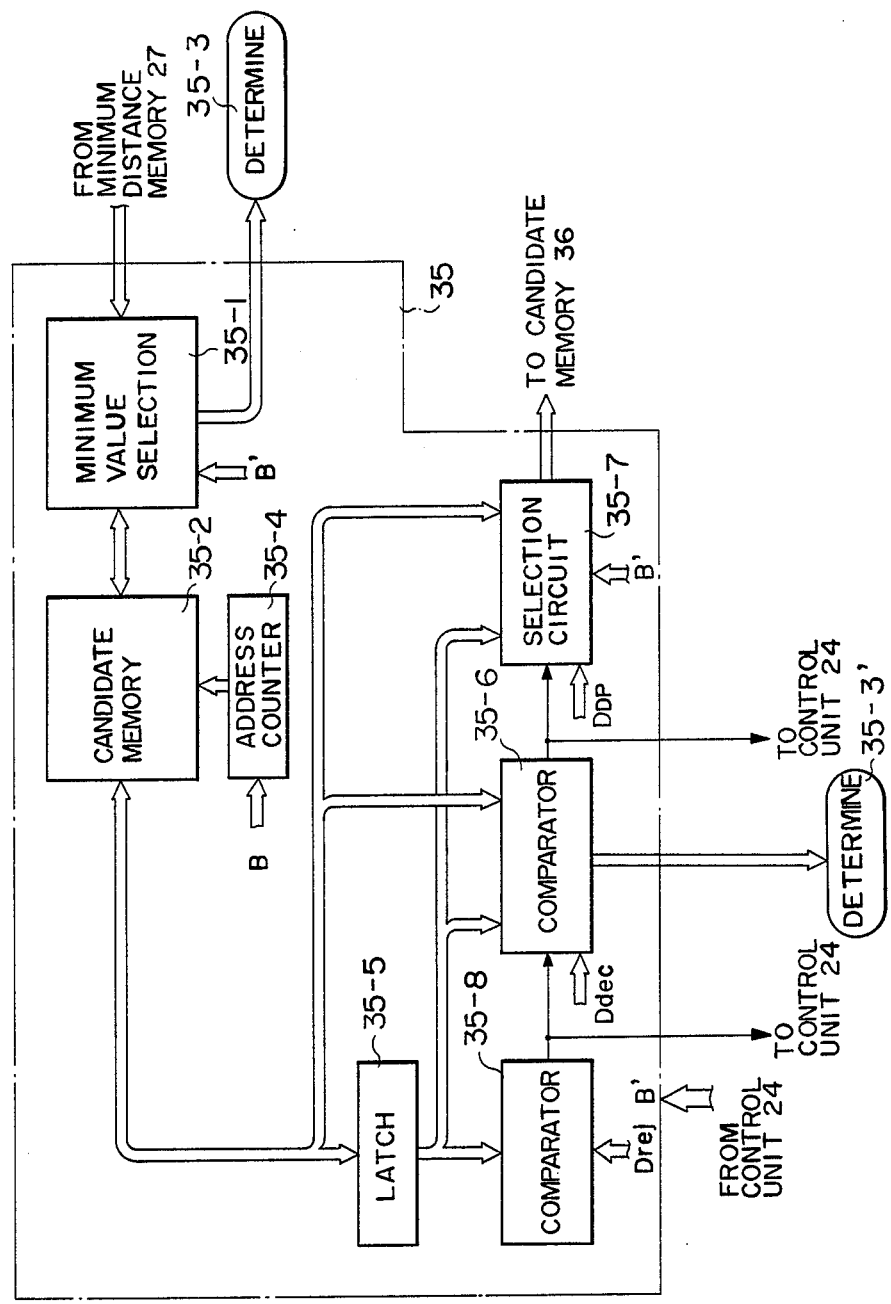
FIG. 9 is a block diagram of the candidate selection unit in FIG. 3.

FIG. 9 shows candidate selection unit 35 of FIG. 3 in detail.

The output of the minimum distance memory 27 is applied to minimum value selection unit 35-1. The first output of minimum value selction unit 35-1 is connected to candidate memory 35-2 and the second output thereof is delivered as the determination signal during the poststage operation (35-3). The output of the address counter 35-4 for counting signals from the control unit 24 is supplied to the address input of candidate memory 35-2. The output of candidate memory 35-2 is applied to latch circuit 35-5, the first input of comparator circuit 35-6 and the first input of selector circuit 35-7. The output of latch circuit 35-3 is connected to the input of the comparator 35-8, the second input of the comparator 35-6 and the second input of selector circuit 35-7. The comparison output of comparator circuit 35-6 is applied to selector circuit 35-7 and control unit 24.

The determination output is applied to control unit 24 as the determination 35-3' by the candidate selection process (step 14). The output of selection circuit 35-7 is applied to candidate number memory 36. The first to third specific values $D_{rej}$, $D_{dec}$, and $D_{DP}$ are applied to comparators 35-8 and 35-6, and selection circuit 35-7, respectively. Signals B applied to address counter 35-4, control signals B' applied to minimum value selection unit 35-1 and selection circuit 35-7, and the first to third specific value $D_{rej}$, $D_{dec}$ and $D_{DP}$ are transmitted from control unit 24. Minimum value selection unit 35-1 compares the minimum distance data sequentially supplied from minimum distance memory 27 with data stored in candidate memory 35-2 in order to detect which data is larger. Candidate memory 35-2 stores the first to fifth minimum distance data counted from the minimum value thereof. Minimum value selection unit 35-1 compares the stored data with the inputted data in such a manner that the comparison is conducted, by starting from the smallest data towards the larger data. If the data supplied from minimum distance memory 27 have a corresponding position in the order, the data and its candidate number are stored in the corresponding position and the following order of data is sequentially shifted. For example, if the values of the minimum distance data of the standard pattern are $B_2$, $B_7$, $B_1$, $B_8$, and $B_4$ an order that it starts from the minimum value and if the value of the minimum distance data $B_9$ of the standard pattern is in the third sequential position when it is counted from the minimum value $B_2$ then $B_9$ is stored in a position of $B_1$, and the values of $B_1$ and $B_8$ are shifted to following positions. Thus, as the result, the order of data is changed from $B_2$, $B_7$, $B_1$, $B_8$ and $B_4$ to $B_2$, $B_7$, $B_9$, $B_1$ and $B_8$. In this manner, the comparison process is conducted with regard to the minimum distance data of all the standard pattern data and the values of the first to fifth minimum distance data ($D(1)$ to $D(5)$) which are counted from the minimum value are stored in candidate memory 35-2. The first to fifth candidates are selected to be stored without any condition. The control of these operations is conducted by control signals B and B' supplied from control unit 24.

The minimum value of the minimum distance data, namely, the first candidate $D(1)$ is outputted from candidate memory 35-2 and stored in atch circuit 35-5, the output of which is added to comparator 35-8, thereby enabling the first candidate to be compared with the first specific value $D_{rej}$ (this corresponds to step 14-2 of FIG. 8). When the first candidate $D(1)$ is more than the first specific value $D_{rej}$, the invalid signal is inputted to the control unit 24 and a decision of in validity is rendered. If the first candidate is smaller than the first specific value, the valid signal is applied to control unit 24. This enables address counter 35-4 to proceed a counting operation in accordance with the control signals B supplied from control unit 24 (as shown in step 14-3 of FIG. 8), thereby making an access to candidate memory 35-2 in which minimum distance data $D(2)$ is stored, and thereby allowing the minimum distance data $D(2)$ of the second candidate outputted from candidate memory 35-2 to be applied to the first input of the comparator 35-6. The comparator 35-6 detects the difference between the data applied to the first input thereof and that applied to the second input and determines whether the difference is smaller than the second specific value $D_{dec}$. The comparator 35-6 is operated by the output of the aforementioned comparator 35-8. As the first candidate data $D(1)$ stored in latch 35-5 is applied to the second input of comparator circuit 35-6, the difference between the minimum distance data $D(2)$ of the second candidate and that $D(1)$ of the first candidate is obtained to be compared with the second predetermined value $D_{dec}$. As the result, if the difference value is more than the second specific value $D_{dec}$, the first candidate is decided as the standard pattern to be detected, thereby enabling the determination signal and number to be delivered to control unit 24 (this corresponds to step 14-3 of FIG. 8). At this time, selector circuit 35-7 does not operate. When the difference value is smaller than the second specific value $D_{dec}$ contrary to the above-described occasion, there is a possibility that other candidates than the first candidate exist, thereby causing operation signals for selecting such candidates to be applied to the selection circuit 35-7. Selection circuit 35-7 performs a selection operation as shown in step 14-4 of FIG. 8 and determines whether the difference value between the first and second inputs is more than the third specific value $D_{DP}$, thereby selecting the second to fifth candidates. The minimum value selection unit 35-1 selects the first to fifth candidates and does not detect the difference from the first candidate data. Selection circuit 35-7 detects such difference and determines whether the difference is smaller than the third specific value $D_{DP}$. Selection circuit 35-7 detects the difference value between the signal $D(n)$ applied to the first input and the signal $D(1)$ applied to the second input. Where the difference value is smaller than the third specific value $D_{DP}$, the candidate number is supplied to candidate number memory 36. When comparator 35-6 applies the operation starting signal to selection circuit 35-7, the selection circuit starts the above-recited operation.

The present circuit starts the operation when the third candidate data is applied to the first input and the candidate numbers of the first and second candidates are sequentially applied to the candidate number memory through selection circuit 35-7 without any condition. When the comparator circuit 35-6 determines that $D(2) - D(1) < D_{dec}$ (step 14-3 of FIG. 8), the first and second candidate numbers are respectively stored in candidate number memory 35-2. The selection circuit 35-7 repeats the above-recited determination operation by starting from the third candidate data. Then, when the difference becomes over the specific value $D_{DP}$, selection circuit 35-7 stops transmitting the candidate number to candidate number memory 36. The number of the candidate number stored in the candidate number memory 36 is five at the maximum and the number changes in the range of two to five, depending on the determination operation of selection circuit 35-7.

FIG. 10 shows a detailed circuit of parameter normalization and compression unit 19 in FIG. 3. The input from A/D convevter 18 is stored in register 60. The output thereof is applied to both maximum value detection 61 and operation circuit 62. The outputs of maximum value detection circuit 61 and threshold memory 64 are applied to comparator 63. The output of comparator 63 is applied to operation circuit 62 and the output is applied to input pattern memory 20 and level detector unit 21 in FIG. 3. The value of 24 is inputted to operational circuit 62. Register 60 stores data supplied from A/D converter 18 for one clock period. Maximum value detection circuit 61 detects the maximum value of data sequentially supplied from register 60. Comparator 63 compares the data supplied from maximum value detection circuit 61 with data transmitted from the threshold memory 64 and changes its output, depending on the result of the comparison. If the data delivered from maximum value detection circuit 61 is smaller than data transmitted from threshold memory 64, namely, threshold level TH, then, threshold level TH is produced. If the data delivered from maximum value detection circuit 61 is larger than data transmitted from threshold memory 64, namely, threshold level TH, then, the data delivered from maximum value detection circuit 61 plus 1 is added to operation circuit 62. The operation circuit 62 divides data supplied from register 60 by the output of comparator 63, thereby allowing the quotient to be multiplied $2^4$ and of, thereby resulting in generation only the integer part of the product. At described above, the maximum value of the data stored in register 60 at every clock is obtained by maximum detection circuit 61 and is delivered to comparator circuit 63. Then, comparator 63 determines whether the inputted maximum value is larger than threshold level TH or not, hereby producing a divisor for use in a normalization operation in operation circuit 62. When the maximum value is more than the threshold level TH, the normalization is conducted by using the maximum value plus 1. When the maximum value is less than the threshold level TH, the normalization is conducted by using the threshold level TH. The operation circuit 62 divides the output sequentially delivered from register 60 by the output operation circuit 62, and multiplies the quotient by $2^4$.

The multiplication by $2^4$ is equivalent to producing the upper 4 bits of the quotient as integers.

Figure 11A:
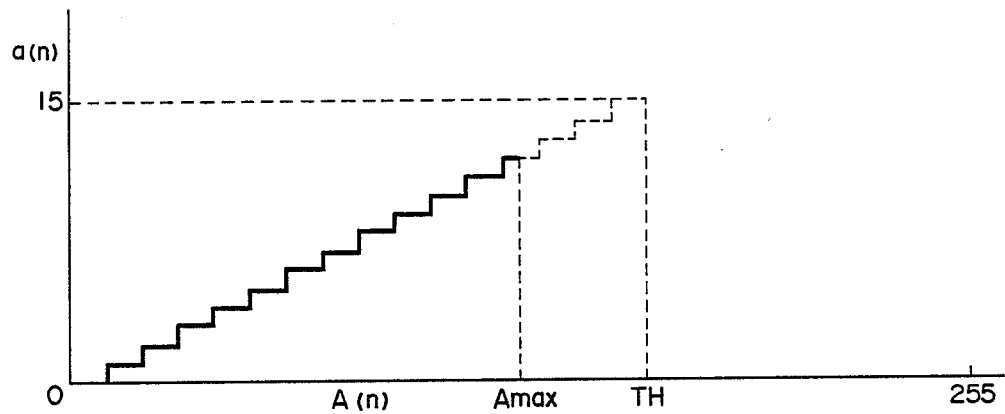
Figure 11B:
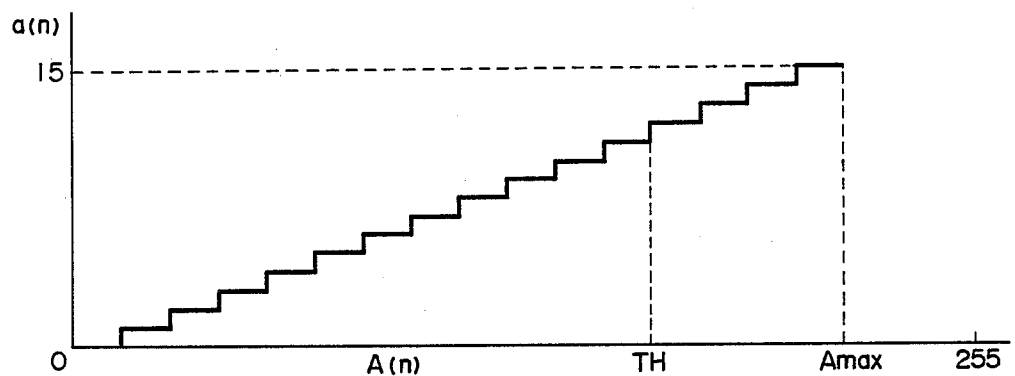

FIGS. 11A and 11B show the relationship between 8 bit input data and 4 bit output data. FIG. 11A designates the case where the maximum value $A_{max}$ is smaller than the threshold level TH and FIG. 11B designates the case where the maximum value is larger than the threshold level TH contrary to FIG. 11A. The input data A(n) changes from "0" to $A_{max}$. In FIG. 11A, the output a(n) does not take a value between 13, namely, 1101 (binary number), and 15, namely, 1111 (binary number), although it is different depending on the magnitude of $A_{max}$. In FIG. 11A, as the normalization is performed by using the threshold level, and the depression is conducted by delivering the upper 4 bits thereof as the output. Thus, A(n) can be divided by TH and the upper 4 bits of the quotient is produced.

On the other hand, in FIG. 11B, $A_{max}$ is more than the threshold level and the range from "0" to "Amax" is divided by 16, thereby determining the output a(n) for the corresponding input data A(n).

The above-described operation converts data of, for example, 8 bits data, into 4 bits data. After the normalization takes place, the upper 4 bits are delivered, namely, the data is compressed to 4 bits, Thus, even in the case where the maximum value is more than the threshold level and the upper 4 bits are 0, the data can be effectively converted into 4 bit data. If the data is less than the threshold level, the normalization is conducted by using the threshold level, thereby preventing the small input data from being abnormally expanded, and thereby making it possible to conduct the process associated with the power level.

Figure 12:
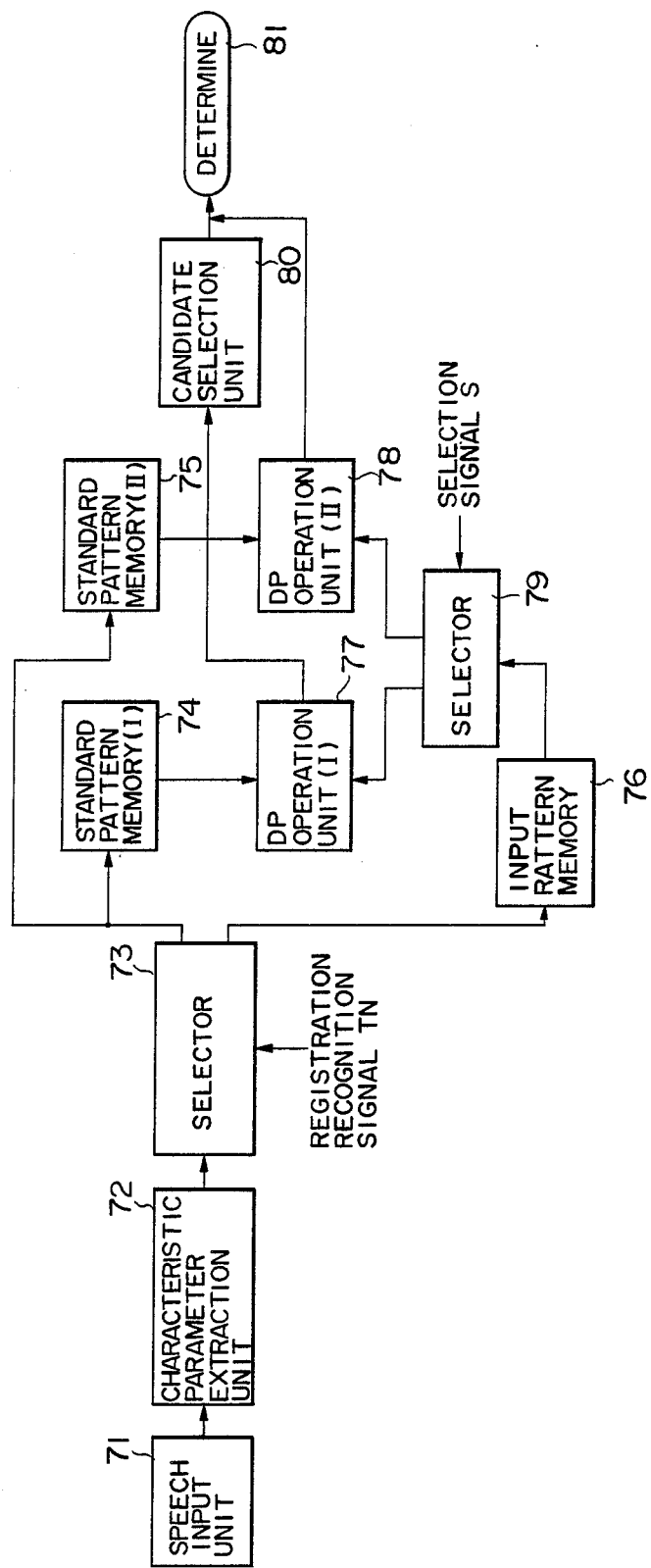
FIG. 12 is a block diagram of further embodiment of the present invention.

FIG. 12 shows a block diagram of the third embodiment.

Speech or voice input unit 71 is connected to selector 73 through characteristic parameter extraction unit 72. The registration recognition signal TN is applied to selector 73, the first output of which is connected to standard pattern memory (I)74 and standard pattern memory (II)75. The second output of selector 73 is connected to input pattern memory 76. The output of standard pattern memory (I)74 is applied to DP operation unit (I)77 and the output of standard pattern memory (II)75 is applied to DP operation unit (II)78. The output of input pattern memory 76 is applied to DP operation unit (I) and DP operation unit (II) through selector 79. The output of DP operation unit (I)77 is applied to determination terminal 81 through candidate selection unit 80 and output of DP operation unit (II)78 is applied to determination terminal 81. Voice input unit 71 comprises the circuit of a microphone, for example, which converts a voice into a voice signal or electric signal. The voice signal obtained from voice input unit 71 is applied to characteristic parameter extraction unit 72 to extract the characteristic of the voice signal. The characteristic parameter extraction unit 72 comprises an AGC circuit for keeping an amplitude level of the voice signal almost constant, a BPF circuit for dividing the output of AGC circuit into predetermined frequency ranges, for example, 8 frequency ranges, and A/D converter for converting the output of the respective filters into digital data. Thus, characteristic parameter extraction unit 72 delivers respective levels of signals obtained by dividing their frequencies into a plurality of frequency ranges as digital data. Selector 73 chooses between a registration of an output of characteristic extraction circuit 72 and a recognition of an input pattern, namely, voice signal by using a resistered data. In the case of registration, the output of characteristic extraction circuit 72 appears at the first output of selector 73, which is, then, stored in standard pattern memory (I)74 and standard pattern memory (II)75. In the case of recognition, the output of characteristic extraction circuit 72 appears at the second output of selector 73, which is stored in input pattern memory 76. In the case of registration, the registration operation has been completed when characteristic data is stored in standard pattern memories (I)74 and (II)75.

In the case of recognition, the following operation takes place. The selection signal S applied to selector 79 allows selector 79 to deliver the output of input pattern memory 76 to DP operation units (I)77 or (II)78. Where the output of input pattern memory 76 is outputted to DP operation unit (I)77, the DP operation unit (I) operates, so that the DP operation is conducted with regard to the contents of both input pattern memory 76 and standard pattern memory (I)74. The minimum distances between the respective input patterns and a plurality of stored standard pattern data are obtained and outputted to candidate selection unit 80. The candidate selection unit 80 obtaines the minimum value among the minimum distance data corresponding to the plural standard patterns and determines the standard pattern corresponding to the minimum value as data which coincides with input pattern data, thereby producing them at determination terminal 81. The output constitutes the result of recognition. On the other hand, where the selector 79 delivers input pattern data to DP operation unit (II)78, DP operation unit(II)78 operates, so that the minimum distance between the input pattern data and 2 or 3 stored standard pattern data are obtained and the standard pattern corresponding to the minimum value is determined as data which accords with the input pattern data, and is delivered to determination terminal 81.

In the above operations, as DP operation unit (I)77 performs DP operation for a plenty of standard patterns stored in standard pattern memory (I)74, it takes a long processing time and the selection of candidates is necessitated. On the other hand, as only 2 or 3 standard pattern data are stored in standard pattern memory (II)75, it takes a short time to perform the DP process in DP operation unit (II)78 with a small amount of errors in recognitions. For example, two standard patterns of "yes" and "no" are stored in standard pattern memory (II)75 and the standard pattern having the shorter minimum distance is selected out of two standard patterns to be outputted as the result of the recognition. This raises a recognition rate and shortens an average recognition process time. The selection signal S is inputted by the apparatus controlled by the operator.

The operation of parameter normalization and compression unit 19 may be conducted by CPU 6 of FIG. 1. According to the process of the parameter normalization compression the inputted data is stored in RAM used as work area memory 26 and is compared with the maximum value inputted up to then. If the inputted data is larger than the maximum value obtained up to then, the inputted data is considered as new maximum value and is stored in that position of a work area in which the maximum value obtained up to then is stored. Contrary to it, if the inputted data is smaller than the maximum data obtained up to then, the data stored in the work area of RAM is not changed. The maximum value stored in the work area is compared with the threshold level TH. In the comparison operation, if the threshold level is larger than the maximum value, the inputted data stored in the work area is divided by the threshold level TH, and the quotient thereof is multiplied by $2^4$, (which is equivalent to 4 bit shifting towards upper bits), thereby forming the data for use. in the following process.

On the other hand the maximum value is more than the threshold level TH, the input data stored in the work area is divided by the maximum value plus 1 and the quotient thereof is multiplied by $2^4$, thereby forming data for use in the following process.

The aforementioned following process includes all the process of speech recognition in which a pre-stage and post-stage DP operation and a DP matching such as level detection are used. These process are performed in CPU by other operations than those of A/D converter 18 and parameter normalization unit 19.

As discribed above in detail, the prevent invention is to provide a DP operation of a two-stage comprising pre-stage and post-stage operation in which the pre-stage operation conducts a candidate selection and the post-stage operation detects a desired pattern among the candidates obtained from the pre-stage operation with a high precision. In the pre-stage operation, a distance calculation is not executed with regard to all the data but is conducted one time relative to a point to be measured, thereby enabling the process speed to be higher and the work area memory to be smaller as compared with the conventional apparatus. Likewise, in the pre-stage operation, the DP operation is executed with regard to only the selected and specified candidates, thereby resulting in higher operation speed and smaller work area memory, also.

Thus, the present invention is advantageous in that DP operation can be conducted in a short period and memory capacity required for the process is small. Furthermore, as a frame period can be made long in a pre-stage DP operation, a distance calculation is made possible during each frame, namely, between the respective sampling points. The operations conducted within a period of receiving input data and performing DP operations for several standard patterns can achieve a high recognition rate equivalent to that obtained by performing DP operations for a plenty of standard patterns.

According to another feature of the present invention, either the maximum value of an input data or a threshold level is selected, depending on the maximum data of the input data. Thus, according to the present invention, it is possible to prevent the expansion of useless data produced by the normalization process, and the expansion of useless data in the normalization of silent sound data is prevented, thereby enabling a rate of memory to be increased.

According to a further feature of the present invention, it has two areas of the memory in which standard patterns are stored in a matching process of DP operations, thereby allowing ordinary standard patterns to be stored in one memory area and 2-3 standard patterns such as "yes" and "no" to be stored in the other memory area. Thus, a process of recognizing special words is made fast and errors in recognition is further reduced.

Accordingly, the present invention can provide a speech recognition apparatus with an high average speed of recognition and with little error in recognition.

What is claimed is:

1. A speech recognition apparatus comprising:
conversion means for converting input speech signals to digital data;
first memory means coupled to said conversion means the digital data output of said conversion means;
second memory means for storing a plurality of standard patterns, each of said standard patterns comprising a plurality of component data;
first operation means for performing a dynamic programming operation on some of the digital output data of said conversion means and on said standard patterns;
candidate selection means coupled to said first operation means for selecting a predetermined number of candidates closest to said input speech signals based on the operation result of said first operation means;
second operation means for performing a dynamic programm operation on said standard pattern data corresponding to said candidate selected by said candidate selection means and on data stored in said first memory means; and
control means coupled to said first and second memory means and including means for coupling only some of the component data of at least some of the standard patterns stored in said second memory means to said first operation means at a predetermined cycle period, and for coupling some of the data stored in said first memory means to said first operation menas at a predetermined cycle period, and means for applying all of said stored data of said first memory means and all of the components of that standard pattern data of said second memory means which corresponds to the candidate selected by said candidate selection means, to said second operation means.

2. The speech recognition apparatus of claim 1, further including third memory means for storing result data obtained by said first and second operation means.

3. The speech recognition apparatus of claim 1, wherein said conversion means comprises;

a filter means for dividing speech signal into a plurality of frequency ranges;

A/D converter means for converting the output level of said filter means into digital data; and normalizing means for normalizing the output of said A/D converter means for providing digital output data comprising a plurality of components.

4. The speech recognition apparatus of claim 3, wherein said conversion means further comprises:

level detection means coupled to said normalizing means for detecting a level of the digital output data of said normalizing means to judge whether said input speech signal represents a voice period or a sllent period;

timing control means for producing a first clock signal and a second clock signal having a lower frequency than the first clock signal and for controlling an operation speed of said A/D converter and of said normalizing means, respectively, such that said A/D converter means and normalizing menas are controlled by said first clock signal when said level detection means detects tha said input speech signal is located in a silent period, and said A/D converter means and normalizing means are controlled by said second clock signal when said level detection means detects that said input speech signal is located in a voice period.

5. The speech recognition apparatus of claim 4, wherein said level detection means further comprises means for detecting that a silent period continues for a predetermined interval after a voice period, said level detection means being coupled to said timing control means and including means for controlling said first operation means and said second operation means based on the result obtained by said level detection means.

6. The speech recognition apparatus of claim 4, wherein said normalization means comprises:

maximum value detection means for detecting and storing the maximum value of the input data, comparison processing means for comparing the output of said maximum value detection means with a predetermined threshold level, and for generating output data, and a further operation means for dividing said input data by the output data of said comparison processing means, said comparison processing means including means for delivering as said output data an output obtained by adding 1 to the output of said maximum valve detection means when the output of said maximum value detection means is more than said threshold level, and for delivering said threshold level value as said output data when the output of said maximum value detection means is less than said threshold level.

7. The speech recognition apparatus of claim 6, wherein said further operation means includes multiplication means for multiplying a predetermined value by the result obtained by dividing the input data by the output data of said comparison processing means, and means for delivering the product of said multiplication to said level detection means.

8. The speech recognition apparatus of claim 1, wherein said candidate selection means includes first comparison means for comparing candidate data of minimum data selected based on an operation result of said first operation result of said first operation means with a first predetermined value, and means for stopping a recognition operation of said first input speech signals when said first predetermined value is larger than said candidate value as the result of a comparison conducted by said first comparison means.

9. The speech recognition apparatus of claim 8, wherein said candidate selection means further includes:

means for detecting a difference between a first candidate data of a minimum value among said plurality of candidate data and a second candidate data of a second minimum value; and second comparison means for comparing the difference obtained by said difference detecting means with a second predetermined value, thereby producing a candidate corresponding to said first cnadidate data as a recognition result without performing an opertion by said second operation means, when said second comparison means determines that said difference obtained by said difference detection means is larger than the second predetermined value.

10. The speech recognition apparatus of claim 1, wherein said first operation means performs said dynamic programming operation on some of said digital output data of said conversion means and on said standard patterns sequentially.

* * * * *

UNITED STATES PATENT AND TRADEMARK OFFICE
CERTIFICATE OF CORRECTION

PATENT NO. : 4,712,243
DATED : Dec. 8, 1987
INVENTOR(S) : NINOMIYA et al

It is certified that error appears in the above-identified patent and that said Letters Patent is hereby corrected as shown below:

Column 2, line 5, "24" should be -- $2^4$ --.

Column 2, line 38, "invnention" should be -- invention --.

Column 3, line 59, "loundness" should be -- loudness --.

Column 4, last line, "pattern" should be -- patterns --.

Column 8, line 32, "continuses" should be -- continues --.

Column 9, line 49, " 301..." should be -- +1... --.

Column 13, line 33, "B $3U+1^1$" should be -- B $3U^1+1$ --.

Column 13, line 36, "B $3U^{111}+^{11}$" should be -- B $3U^{n111+1}$ --.

Column 21, claim 4, line 20, "menas" should be -- means --.

Column 21, claim 4, line 22, "Tha" should be -- that --.

Column 22, claim 8, line 16 "a" was omitted following "includes".

Column 22, claim 8, line 22, "first" should be deleted.

Signed and Sealed this

Third Day of January, 1989

Attest:

DONALD J. QUIGG

Attesting Officer

Commissioner of Patents and Trademarks